(12) United States Patent
Nishino et al.

(10) Patent No.: US 11,318,536 B2
(45) Date of Patent: May 3, 2022

(54) ADDITIVE MANUFACTURING APPARATUS AND ADDITIVE MANUFACTURING METHOD

(71) Applicant: Kabushiki Kaisha Toshiba, Minato-ku (JP)

(72) Inventors: Tomoko Nishino, Yokohama (JP); Naotada Okada, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/801,324

(22) Filed: Feb. 26, 2020

(65) Prior Publication Data

US 2020/0198012 A1    Jun. 25, 2020

Related U.S. Application Data

(62) Division of application No. 15/505,448, filed as application No. PCT/JP2015/055080 on Feb. 23, 2015, now abandoned.

(30) Foreign Application Priority Data

Sep. 16, 2014   (JP) ................................. 2014-187982

(51) Int. Cl.
*B22F 10/20*    (2021.01)
*B29C 67/00*    (2017.01)
(Continued)

(52) U.S. Cl.
CPC ............ *B22F 10/20* (2021.01); *B29C 64/153* (2017.08); *B29C 64/386* (2017.08); *B29C 67/00* (2013.01);
(Continued)

(58) Field of Classification Search
CPC .......... B22F 10/20; B22F 10/30; B29C 67/00; B29C 64/153; B29C 64/386;
(Continued)

(56) References Cited

U.S. PATENT DOCUMENTS

2003/0231225 A1    12/2003   Shimosako
2004/0141018 A1    7/2004    Silverbrook
(Continued)

FOREIGN PATENT DOCUMENTS

JP    59-162451 A    9/1984
JP    4-147053 A     5/1992
(Continued)

OTHER PUBLICATIONS

International Search Report dated Apr. 28, 2015, in PCT/JP2015/055080, filed Feb. 23, 2015.

*Primary Examiner* — Rebecca Janssen
(74) *Attorney, Agent, or Firm* — Oblon, McClelland, Maier & Neustadt, L.L.P.

(57) ABSTRACT

An additive manufacturing apparatus according to one embodiment includes a manufacturing unit, an elastic wave generation unit, an elastic wave detection unit, and an inspection unit. The manufacturing unit sequentially stacks a layer formed by emitting a first energy beam to a material and solidifying the material. The elastic wave generation unit emits a second energy beam to a manufactured object including the layer and generates an elastic wave propagating in the manufactured object. The elastic wave detection unit detects the elastic wave. The inspection unit inspects the manufactured object on the basis of a detection result from the elastic wave detection unit.

7 Claims, 8 Drawing Sheets

(51) Int. Cl.
*B29C 64/153* (2017.01)
*G01N 29/04* (2006.01)
*B33Y 10/00* (2015.01)
*B33Y 50/02* (2015.01)
*G01N 21/17* (2006.01)
*G01N 29/24* (2006.01)
*B29C 64/386* (2017.01)
*B33Y 30/00* (2015.01)
*G01B 11/24* (2006.01)
*B22F 10/30* (2021.01)
*B29K 105/00* (2006.01)

(52) U.S. Cl.
CPC .............. *B33Y 10/00* (2014.12); *B33Y 30/00* (2014.12); *B33Y 50/02* (2014.12); *G01B 11/2441* (2013.01); *G01N 21/1702* (2013.01); *G01N 21/1717* (2013.01); *G01N 29/043* (2013.01); *G01N 29/2418* (2013.01); *B22F 10/30* (2021.01); *B29K 2105/251* (2013.01); *G01N 2021/1706* (2013.01); *G01N 2291/0289* (2013.01); *G01N 2291/267* (2013.01); *G01N 2291/2698* (2013.01); *Y02P 10/25* (2015.11)

(58) Field of Classification Search
CPC .......... B29C 64/188; B29C 64/00–295; G01N 29/043; G01N 21/1717; G01N 29/2418; G01N 21/1702; G01N 2291/0289; G01N 2291/267; G01N 2291/2698; G01N 2021/1706; B33Y 50/02; B33Y 10/00; B33Y 30/00; G01B 11/2441; Y02P 10/25; B29K 2105/251

See application file for complete search history.

(56) References Cited

U.S. PATENT DOCUMENTS

| | | | |
|---|---|---|---|
| 2006/0165546 | A1 | 7/2006 | Yamada et al. |
| 2006/0208396 | A1 | 9/2006 | Abe et al. |
| 2006/0215175 | A1* | 9/2006 | Yacoubian ......... G01N 21/9505 356/502 |
| 2008/0167831 | A1 | 7/2008 | Pouet |
| 2012/0138586 | A1 | 6/2012 | Webster et al. |
| 2015/0201500 | A1 | 7/2015 | Shinar |
| 2016/0325541 | A1* | 11/2016 | Lavrentyev ......... B23K 26/702 |

FOREIGN PATENT DOCUMENTS

| | | |
|---|---|---|
| JP | 4-366761 A | 12/1992 |
| JP | 5-96632 A | 4/1993 |
| JP | 2004-9574 A | 1/2004 |
| JP | 2004-114462 A | 4/2004 |
| JP | 2004-277881 A | 10/2004 |
| JP | 2006-45584 A | 2/2006 |
| JP | 2006-200030 A | 8/2006 |
| JP | 2008-254241 A | 10/2008 |
| JP | 2009-274338 A | 11/2009 |
| JP | 2012-163406 A | 8/2012 |
| JP | 2012-246541 A | 12/2012 |
| WO | 2004/062918 A1 | 7/2004 |

* cited by examiner

ADDITIVE MANUFACTURING APPARATUS AND ADDITIVE MANUFACTURING METHOD

CROSS-REFERENCE TO RELATED APPLICATIONS

This application is a division of U.S. application Ser. No. 15/505,448, filed Feb. 21, 2017, which is a national stage application of International Application No. PCT/JP2015/055080, filed Feb. 23, 2015, which designates the United States, incorporated herein by reference, and which is based upon and claims the benefit of priority from Japanese Patent Application No. 2014-187982, filed Sep. 16, 2014, the entire contents of which are incorporated herein by reference.

FIELD

Embodiments described herein relate generally to an additive manufacturing apparatus and an additive manufacturing method.

BACKGROUND

Conventionally, there has been known an additive manufacturing apparatus to form an additive manufactured object. The additive manufacturing apparatus forms a layer by melting a powder material by a laser beam, and forms the additive manufactured object having a three-dimensional shape by stacking the layers.

A manufactured object which is manufactured by such an additive manufacturing apparatus may contain an abnormal area such as a bubble generated during manufacture. It is significant to obtain an additive manufacturing apparatus and an additive manufacturing method which allow detection of abnormality in such a manufactured object.

DETAILED DESCRIPTION

In general according to one embodiment, an additive manufacturing apparatus includes a manufacturing unit, an elastic wave generation unit, an elastic wave detection unit, and an inspection unit. The manufacturing unit sequentially stacks a layer formed by irradiating a material with a first energy beam and solidifying the material. The elastic wave generation unit emits a second energy beam to a manufactured object including the layer and generates an elastic wave propagating in the manufactured object. The elastic wave detection unit detects the elastic wave. The inspection unit inspects the manufactured object on the basis of a detection result from the elastic wave detection unit.

DETAILED DESCRIPTION

Figure 1:
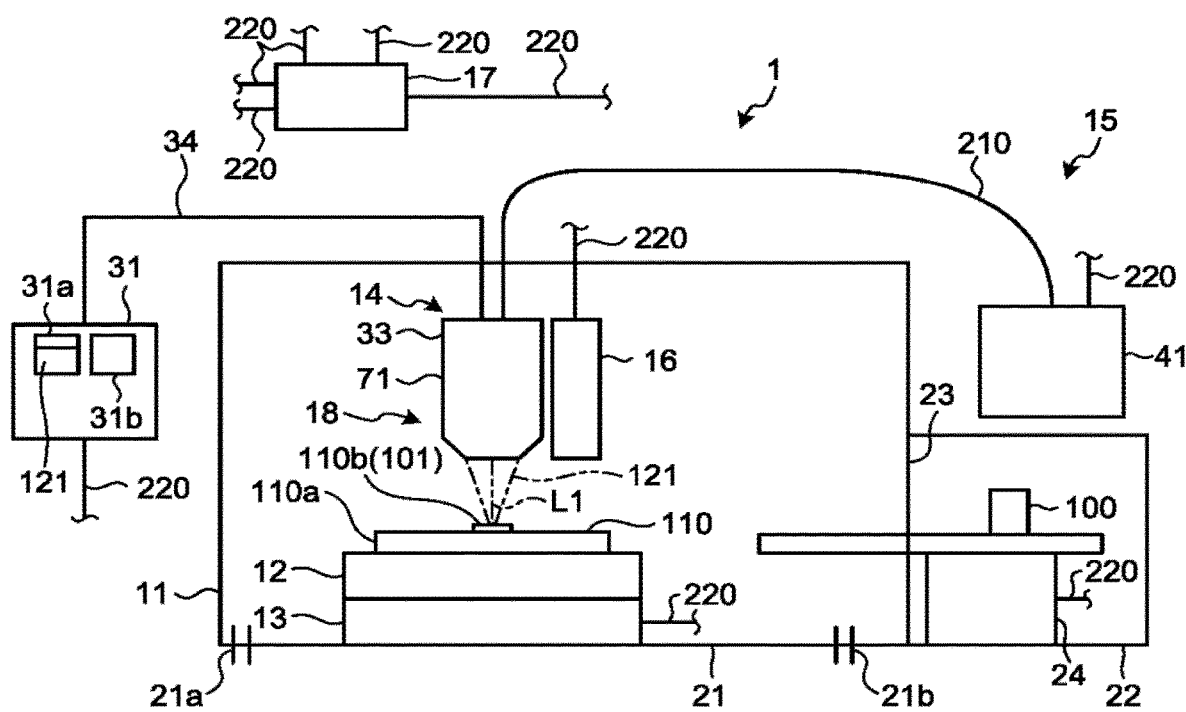
FIG. 1 is an exemplary schematic view of an additive manufacturing apparatus according to a first embodiment.

Embodiments will be described below with reference to the drawings. Note that, in the following embodiments, similar elements are included. Therefore, in the following, those similar elements are denoted by common reference numerals/signs, and repeated description will be omitted.

First Embodiment

An additive manufacturing apparatus 1 according to the present embodiment, illustrated in FIG. 1, forms an additive manufactured object according to a laser deposition method. The additive manufacturing apparatus 1 includes a treatment tank 11, a stage 12, a moving device 13, a nozzle device 14, an optical device 15, an inspection device 16, a control unit 17, and the like. The additive manufacturing apparatus 1 feeds a material 121 (manufacturing material) through the nozzle device 14, and irradiates the material 121 with a laser beam L1 to form a layer 110b of the material 121 on an object 110 disposed on the stage 12, so that the layers 110b are stacked to form an additive manufactured object 100. Here, a manufactured object 101 includes at least one layer 110b. The manufactured object 101 represents an intermediate product provided in a manufacturing process of the additive manufactured object 100, or the additive manufactured object 100 having been formed.

The object 110 is an object to which the material 121 is fed through the nozzle device 14, and includes a base 110a and the layer 110b. A plurality of the layers 110b is stacked on an upper face of the base 110a. The material 121 includes a powdered metal material, a powdered resin material, or the like. Alternatively, the material 121 may be not the powdered material but a linear material. For manufacturing, at least one material 121 can be used.

In the treatment tank 11, a main chamber 21 and a sub-chamber 22 are provided. The sub-chamber 22 is provided adjacent to the main chamber 21. Between the main chamber 21 and the sub-chamber 22, a door portion 23 is provided. When the door portion 23 is opened, the main chamber 21 and the sub-chamber 22 communicate with each other, and when the door portion 23 is closed, the main chamber 21 is air-tightly sealed.

In the main chamber 21, an air inlet hole 21a and an air outlet hole 21b are provided. An inert gas such as nitrogen or argon is supplied into the main chamber 21 through the air inlet hole 21a by operation of an air supplying device (not illustrated). A gas in the main chamber 21 is exhausted from the main chamber 21 through the air outlet hole 21b by operation of an air exhausting device (not illustrated).

Furthermore, in the main chamber 21, a transfer device (not illustrated) is provided. Furthermore, a conveying device 24 is provided from the main chamber 21 to the sub-chamber 22. The transfer device transfers the additive manufactured object 100 treated in the main chamber 21 to the conveying device 24. The conveying device 24 conveys the additive manufactured object 100 transferred from the transfer device, into the sub-chamber 22. That is, the subchamber 22 stores therein the additive manufactured object 100 treated in the main chamber 21. After the additive manufactured object 100 is stored in the sub-chamber 22, the door portion 23 is closed, and the sub-chamber 22 and the main chamber 21 are isolated from each other.

In the main chamber 21, the stage 12, the moving device 13, part of the nozzle device 14, the inspection device 16, and the like are provided.

The stage 12 supports the object 110. The moving device 13 can move the stage 12 in orthogonal triaxial directions.

The nozzle device 14 feeds the powdered (or linear) material 121 to the object 110 positioned on the stage 12. Furthermore, the nozzle device 14 has a nozzle 33 irradiating the object 110 positioned on the stage 12 with the laser beam L1. Furthermore, the nozzle 33 performs irradiation with the laser beam L1 while feeding the material 121. The nozzle device 14 irradiates the material 121 with the laser beam L1 to melt the material 121, and forms the layer 110b. The nozzle device 14 repeatedly forms the layer 110b, and sequentially stacks the layers 110b. The nozzle device 14 constitutes a manufacturing unit 18 together with the optical device 15. The laser beam L1 is an example of a first energy beam. Note that, the energy beam preferably melts or sinters the material 121, and may be, for example, an electron beam or an electromagnetic wave ranging from microwaves to ultraviolet.

The nozzle device 14 has a feeding device 31 (manufacturing material feeding device), the nozzle 33, a feed tube 34, and the like. The material is fed from the feeding device 31 to the nozzle 33, through the feed tube 34.

The feeding device 31 includes a tank 31a and a feed unit 31b. The tank 31a stores therein the powder material 121. The feed unit 31b feeds a predetermined amount of the material 121 in the tank 31a, to the nozzle 33. When the material 121 is the powdered material, the feed unit 31b feeds a carrier gas containing the material 121 to the nozzle 33. The carrier gas is, for example, an inert gas such as nitrogen or argon.

Figure 2:
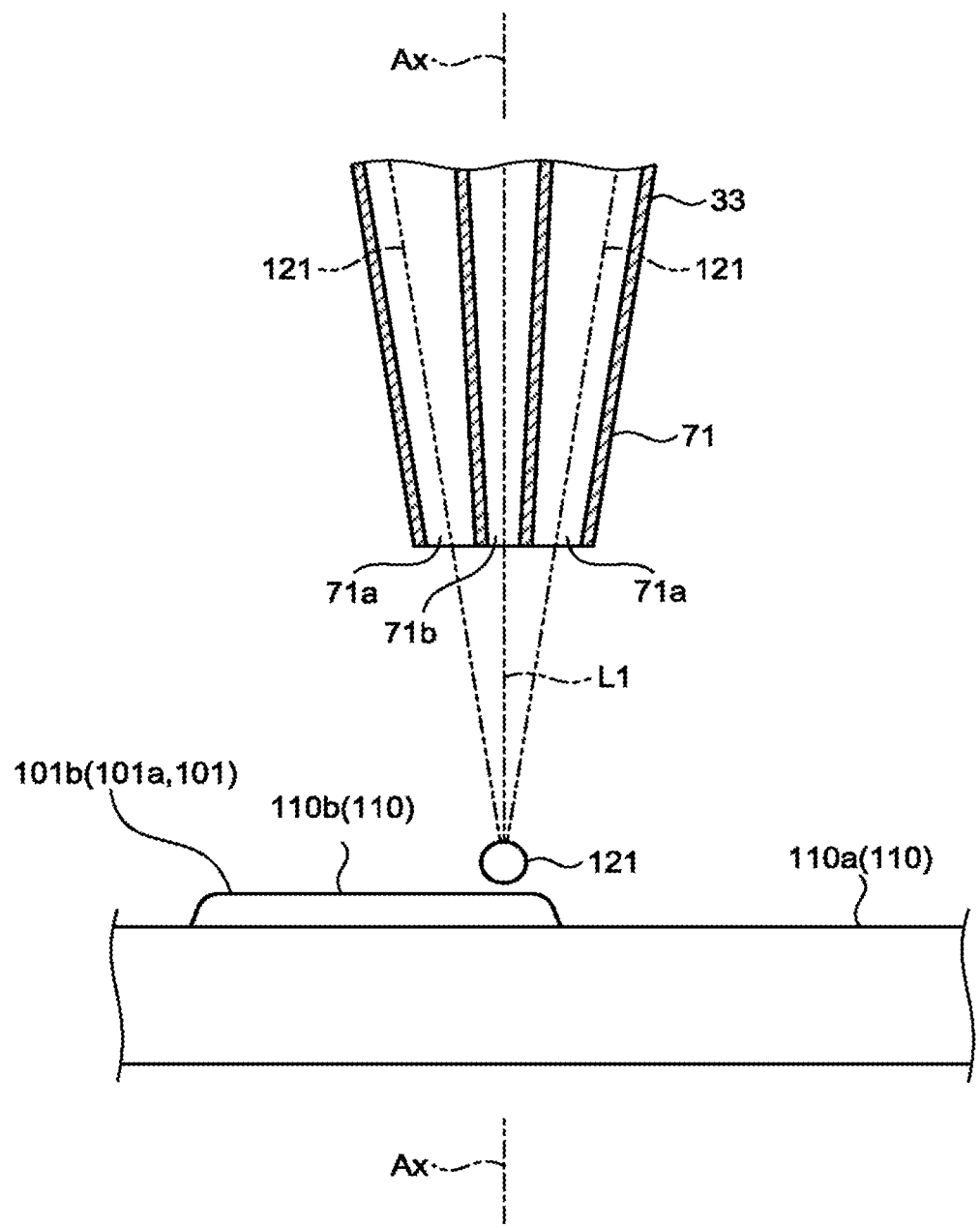
FIG. 2 is an exemplary schematic cross-sectional view of part of a nozzle according to the first embodiment.

The nozzle 33 has a casing 71. The casing 71 is configured to have a vertically elongated tubular shape. As illustrated in FIG. 2, in the casing 71, a plurality of passages 71a and a single passage 71b are provided.

The passage 71b is positioned coaxially with an axis Ax of the casing 71. That is, the passage 71b extends vertically. In the passage 71b, the laser beam L1 is introduced from the optical device 15. In the passage 71b, an optical system is provided which includes a conversion lens for converting the laser beam L1 to parallel light, and a lens for focusing the laser beam L1 converted to the parallel light. The laser beam L1 is focused under the casing 71 by the lens. The laser beam L1 has a focal point (convergence point) positioned on the axis Ax.

Each of the passages 71a is connected to the feeding device 31 through the feed tube 34. When the material 121 is the powdered material, the material 121 is fed to each passage 71a from the feeding device 31, together with the carrier gas. The passage 71a has a lower portion inclined with respect to the axis Ax of the casing 71 to be closer to the axis Ax toward the lower side.

When the material 121 is the powdered material, the nozzle 33 jets (injects) the material 121 below the casing 71 (passage 71a), from a lower end (an opening) of the passage 71a. Alternatively, when the material 121 is the linear material, the nozzle 33 extrudes (injects) the material 121 below the casing 71 (passage 71a), from the lower end (the opening) of the passage 71a. The jetted or extruded material 121 reaches the convergence point of the laser beam L1. The material 121 fed by the nozzle 33 is melted by the laser beam L1 to form a mass of the molten material 121. Note that, the material 121 may be sintered by the laser beam L1.

As illustrated in FIG. 1, the optical device 15 includes a laser emitter 41 and a cable 210. The laser emitter 41 has an oscillator (not illustrated), and emits the laser beam L1 by oscillation of the oscillator. The laser emitter 41 can change a power density of the laser beam L1 to be emitted. The laser emitter 41 is connected to the nozzle 33 through the cable 210. The laser beam L1 emitted from the laser emitter 41 is guided to the nozzle 33.

Figure 3:
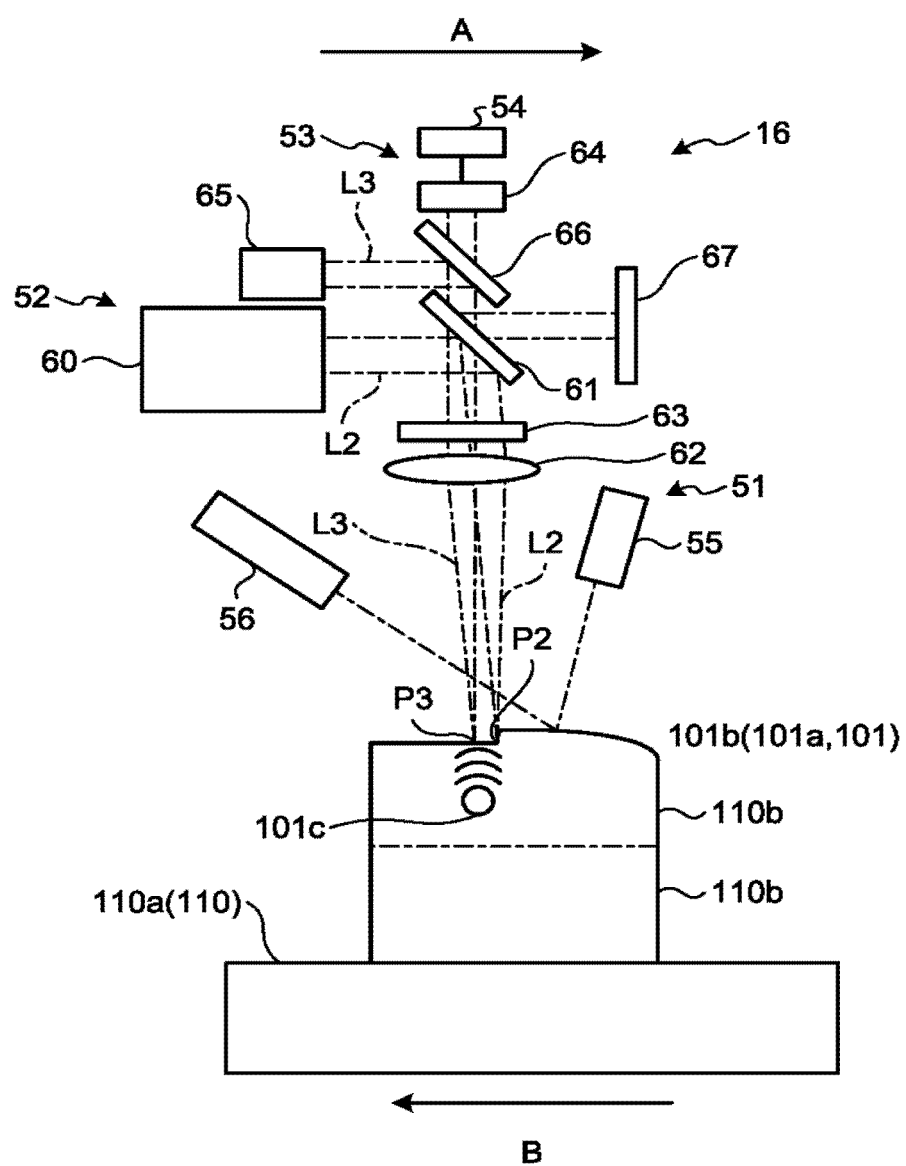
FIG. 3 is an exemplary schematic view of an inspection device according to the first embodiment.

As illustrated in FIG. 3, the inspection device 16 (apparatus) has a measurement unit 51, a processing unit 52, a laser interferometer 53, and an inspection unit 54 (abnormality detection unit). The measurement unit 51 measures a shape of the manufactured object 101. The processing unit 52 irradiates the manufactured object 101 with a laser beam L2 to partially remove a surface 101a of the manufactured object 101, and generates an elastic wave propagating in the manufactured object 101, upon impact of irradiation with the laser beam L2. Furthermore, the processing unit 52 processes the surface 101a of the manufactured object 101 on the basis of a measurement result from the measurement unit 51, and irregularities on the surface 101a of the manufactured object 101 can be reduced, that is, can be leveled. The laser interferometer 53 detects the elastic wave. The inspection unit 54 inspects the manufactured object 101 on the basis of a detection result of the elastic wave.

The measurement unit 51 has an illuminating device 55 (illuminating apparatus), a camera 56 (imaging unit), and an image processing device (not illustrated). The measurement unit 51 measures a shape of a surface of an object to be measured (layer 110b or manufactured object 101), for example, using a light section method. In this measurement, the illuminating device 55 irradiates the surface of the object to be measured (layer 110b or manufactured object 101) with linear light. The camera 56 captures an image including the linear light. The image processing device measures irregularities in the surface shape on the basis of a position of the linear light (deviation from reference line). The measurement unit 51 transmits the measured shape (measurement result) to the control unit 17 (see FIG. 1). Note that, the measurement unit 51 may measure the shape of the object to be measured using a method (e.g., interference method or the like) other than the light section method.

The processing unit 52 has a laser emitter 60 (light source), a beam splitter 61, and a lens 62 (condensing lens).

The laser emitter 60 has the oscillator (not illustrated), and emits the laser beam L2 by oscillation of the oscillator. The laser beam L2 is, for example, a pulse laser beam. The laser emitter 60 emits the laser beam L2 having intensity large enough to vaporize a solidified material 121 of the manufactured object 101. The laser beam L2 emitted from the laser emitter 60 is made incident to the beam splitter 61.

The beam splitter 61 is positioned on a side of the laser emitter 60, from which the laser beam L2 is emitted. The beam splitter 61 reflects part of the incident laser beam L2. Note that, in FIG. 3 and the like, illustration of the laser beam L2 emitted from the laser emitter 60 and passing through the beam splitter 61 is omitted. The laser beam L2 reflected from the beam splitter 61 is made incident to the lens 62.

The laser beam L2 from the beam splitter 61 is focused by the lens 62, and irradiates the surface 101a of the manufactured object 101 (layer 110b). Specifically, the laser beam L2 irradiates, for example, an end face 101b of the manufactured object 101 in a stacking direction of the plurality of layers 110b. At this time, the laser beam L2 irradiates the end face 101b (surface 101a) of the manufactured object 101, substantially along a normal direction (stacking direction of the layers 110b) of the end face 101b (surface 101a).

The processing unit 52 vaporizes part of the material of the manufactured object 101 and removes part of the manufactured object 101 with the laser beam L2 irradiating the manufactured object 101 through the above-described optical system (first optical system). At this time, the processing unit 52 can change an amount of manufactured object 101 to be removed according to a measurement result from the measurement unit 51 to reduce the irregularities on the surface 101a (end face 101b), that is, to level the end face 101b (surface 101a). The processing unit 52 can change an amount of end face 101b (surface 101a) to be removed by, for example, changing the intensity of the laser beam L2. In this case, the intensity of the laser beam L2 is set larger with increasing height of the surface 101a. The processing unit 52 processes the end face 101b to have a flat face parallel with a movement direction (direction orthogonal to the stacking direction) of the stage 12.

Furthermore, the processing unit 52 generates the elastic wave (density wave) in the manufactured object 101, upon impact of irradiation of the end face 101b (surface 101a) with the laser beam L2. In the manufactured object 101, the elastic wave radially propagates from a processing position processed by the laser beam L2 on the end face 101b (surface 101a). The processing unit 52 is an example of an elastic wave generation unit and a removal unit. That is, the elastic wave generation unit serves as the processing unit 52 and the removal unit. In other words, the processing unit 52 serves as the elastic wave generation unit and the removal unit. Furthermore, the laser beam L2 is an example of a second energy beam and a first laser beam.

Furthermore, an optical filter 63 is provided between the beam splitter 61 and the lens 62. The optical filter 63 is configured to transmit the laser beam L2 reflected from the beam splitter 61 to the lens 62, and not to transmit the reflected light of the laser beam L2 irradiating the manufactured object 101 through the lens 62 and reflected from the manufactured object 101. Furthermore, an optical filter (not illustrated) can be provided on the opposite side of the beam splitter 61 relative to the laser emitter 60. The optical filter does not transmit the laser beam L2 emitted from the laser emitter 60 and passing through the beam splitter 61.

The laser interferometer 53 has a laser emitter 65, a beam splitter 66, the beam splitter 61, the lens 62, a mirror 67, and a detector 64. The laser interferometer 53 detects the elastic wave propagating in the manufactured object 101. The laser interferometer 53 is an example of an elastic wave detection unit.

The laser emitter 65 has the oscillator (not illustrated), and emits a laser beam L3 oscillated by the oscillator. The laser beam L3 is, for example, a continuous laser beam (CW laser beam) or a pulse laser beam. The laser beam L3 emitted from the laser emitter 65 is made incident to the beam splitter 66.

The beam splitter 66 is positioned on a side of the laser emitter 65, from which the laser beam L3 is emitted. The beam splitter 66 partially reflects the incident laser beam L3. The laser beam L3 reflected from the beam splitter 66 is made incident to the lens 62. Note that, in FIG. 3 and the like, the laser beam L3 emitted from the laser emitter 65 and passing through the beam splitter 66 is not illustrated.

The laser beam L3 from the beam splitter 66 is focused by the lens 62, and irradiates the end face 101b (surface 101a) of the manufactured object 101 (layer 110b). At this time, the laser beam L3 irradiates the end face 101b (surface 101a) of the manufactured object 101 substantially along a normal direction of the end face 101b (surface 101a). The laser beam L3 irradiating the end face 101b is reflected from the end face 101b, and is made incident to the detector 64 as detected light through the lens 62, the beam splitter 61, and the beam splitter 66. The end face 101b of the manufactured object 101 is oscillated by a reflected wave (elastic wave) of the elastic wave reflected in the manufactured object 101. The laser interferometer 53 detects displacement of the end face 101b on the basis of reflected light from the end face 101b. Note that, the laser emitter 65 emits the laser beam L3 having intensity at which the material 121 does not melt on the end face 101b.

While, part of the laser beam L3 emitted from the laser emitter 65 and made incident to the beam splitter 61 through the beam splitter 66 is reflected from the beam splitter 61 and made incident to the mirror 67.

The mirror 67 reflects the incident laser beam L3. Part of the laser beam L3 reflected from the mirror 67 is made incident to the detector 64 as reference light through the beam splitter 61 and the beam splitter 66.

The detector 64 is positioned on the opposite side of the beam splitter 66 relative to the beam splitter 61. The detector 64 receives reflected light (detected light) of the laser beam L3 reflected from the end face 101b of the manufactured object 101, and reflected light (reference light) of the laser beam L3 reflected from the mirror 67. The detector 64 can detect displacement of the end face 101b (temporal change in height of the end face 101b) on the basis of interference between the detected light and the reference light. That is, the detector 64 detects the elastic wave (reflected wave) on the end face 101b of the manufactured object 101.

The inspection unit 54 detects (determines) an abnormality 101c in the manufactured object 101 on the basis of a detection result from the detector 64. Here, when a portion of the manufactured object 101 having no abnormality 101c therein is inspected, the elastic wave generated on the end face 101b reaches a bottom face of the manufactured object 101, is reflected from the bottom face, and returns to the end face 101b. In contrast, when a portion of the manufactured object 101 having the abnormality 101c therein is inspected, the elastic wave generated on the end face 101b is reflected from the abnormality 101c and returns to the end face 101b. That is, an elapsed time is longer with increasing depth of the abnormality 101c, and the elapsed time is shorter with decreasing depth of the abnormality 101c. Therefore, the inspection unit 54 can detect the depth (position) of the abnormality 101c on the basis of the elapsed time from emission of the laser beam to detection of the displacement of the end face 101b, or on the basis of a parameter changing according to the elapsed time.

Furthermore, when the abnormality 101c is a void, the reflected wave has a smaller intensity with decreasing size of the abnormality 101c and with increasing density of the inspected portion, and the reflected wave has a larger intensity with increasing size of the abnormality 101c and with decreasing density of the inspected portion. Therefore, the inspection unit 54 can detect a size of the abnormality 101c or a density of an inspected portion, on the basis of the intensity (amplitude) of the reflected wave or the parameter changing according to the intensity of the reflected wave.

As described above, the inspection unit 54 can detect the presence or absence, the depth (position), the density, or the like of the abnormality 101c in the manufactured object 101, on the basis of a detection result (elastic wave, elastic wave signal) from the detector 64. Note that, the inspection unit 54 can detect a position of the abnormality 101c on a plane orthogonal to the stacking direction, on the basis of information obtained from the control unit 17 and representing an irradiation position of the laser beam L3 from the laser emitter 65. Furthermore, the inspection unit 54 has, for example, a control unit and a storage unit. The control unit has a central processing unit (CPU), a controller, or the like. The storage unit has a read only memory (ROM), a random access memory (RAM), and the like. The control unit can execute various calculation processing relating to the abnormality detection according to a loaded program (e.g., an operating system (OS), an application, or a web application).

Figure 4:
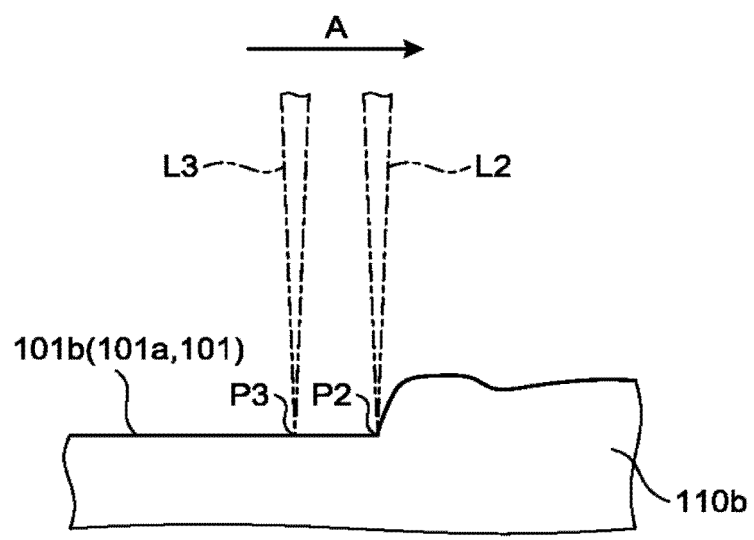
FIG. 4 is an exemplary schematic view of irradiation positions of laser beams according to the first embodiment

Here, in the present embodiment, a single lens 62 focuses the laser beam L2 and the laser beam L3, as illustrated in FIG. 3. However, as illustrated in FIG. 4, a focal position (converging position) of the laser beam L2 focused by the lens 62 is different in location from a focal position (converging position) of the laser beam L3 focused by the lens 62. Specifically, in a relative movement direction of the laser beams L2 and L3, that is, the relative movement direction of the inspection device 16 relative to the manufactured object 101 (direction indicated by an arrow A in FIG. 3), an irradiation position P3 of the laser beam L3 is positioned in back (on the upstream side) of an irradiation position P2 of the laser beam L2. Therefore, the laser beam L3 irradiates a position of the end face 101b which has the irregularities reduced or leveled by the laser beam L2, and displacement is then detected on the basis of the reflected wave (elastic wave) from the position. Thus, according to the present embodiment, displacement can be detected with high accuracy, compare with, for example, detection of the displacement based on a reflected wave (elastic wave) from a position which has irregularities not reduced by the laser beam L2 and to which the laser beam L3 irradiates. Note that, an arrow B in FIG. 3 represents the movement direction of the stage 12 (manufactured object 101) moved by driving the moving device 13.

Furthermore, in the present embodiment, the laser beam L2 (first laser beam) and the laser beam L3 (second laser beam) may have different wavelengths so that the laser beams do not interfere with each other. Specifically, for example, the wavelength of the laser beam L2 may be shorter than the wavelength of the laser beam L3. Furthermore, the laser beam L2 and the laser beam L3 may be different in polarization direction (polarization plane) so that the laser beams do not interference with each other. Specifically, for example, one of the laser beam L2 and the laser beam L3 may be P polarized light, and the other thereof may be S polarized light.

Furthermore, when the laser beam L2 has a smaller pulse width, the elastic wave has a higher frequency and resolution is increased, whereby detection of a smaller abnormality 101c is facilitated. However, when the laser beam L2 has the smaller pulse width, that is, the elastic wave has a higher frequency, the elastic wave is more absorbed in the manufactured object 101 and detection of the elastic wave is made more difficult. Accordingly, the pulse width of the laser beam L2 is set according to the size of the abnormality 101c to be detected. For example, for the abnormality 101c having a size not less than several micrometers, the pulse width of the laser beam L2 can be set to 1 fs to 1 ns.

As an example, the control unit 17 has a central processing unit (CPU) and a storage unit. The storage unit has a read only memory (ROM), a random access memory (RAM), and the like. The control unit 17 is electrically connected to the moving device 13, the optical device 15, the conveying device 24, the feeding device 31, and the inspection device 16, through a signal line 220. The control unit 17 (CPU) controls the moving device 13, the optical device 15, the conveying device 24, the feeding device 31, and the inspection device 16, according to a loaded program (e.g., an operating system (OS), an application, or a web application). The additive manufacturing apparatus 1 forms the additive manufactured object 100 on the basis of control (program) of the control unit 17.

The control unit 17 controls the moving device 13 to move the stage 12 in the triaxial directions. The control unit 17 controls the conveying device 24 to convey the additive manufactured object 100 having been formed to the subchamber 22. The control unit 17 controls the feeding device 31 to adjust feeding or non-feeding of the material 121 and an amount of the material 121 to be fed. The control unit 17 controls the laser emitter 41 to adjust the intensity (power density) of the laser beams L1, L2, and L3 emitted from the laser emitters 41, 60, and 65. Furthermore, the control unit 17 controls a moving device (not illustrated) to control the movement of the nozzle 33. Furthermore, the control unit 17 controls a moving device (not illustrated) to control the movement of the inspection device 16.

The storage unit of the control unit 17 stores therein data or the like representing a shape (reference shape) of the additive manufactured object 100 to be formed. This shape data includes data about the shape (reference shape) of each layer 110b.

The control unit 17 has a function of determining the shape of the layer 110b or the additive manufactured object 100. The control unit 17 compares the shape of the layer 110b or the additive manufactured object 100 measured by the measurement unit 51 with the reference shape stored in the storage unit, and determines whether a portion without a predetermined shape is formed.

Furthermore, the control unit 17 has a function of trimming the shape of the layer 110b or the additive manufactured object 100 into a predetermined shape. The control unit 17 controls the laser emitter 60 of the processing unit 52 so that the laser beam L2 has intensity strong enough to vaporize a portion (portion to be removed) of the layer 110b or the additive manufactured object 100 having a shape other than the predetermined shape. Next, the control unit 17 controls the processing unit 52 and the moving device 13 so that the laser beam L2 irradiates the portion. Therefore, the portion is vaporized.

Next, an example of a procedure of forming the additive manufactured object 100 by the additive manufacturing apparatus 1 (i.e., a method for producing the additive manufactured object 100) will be described with reference to a flowchart of FIG. 5.

First of all, the control unit 17 controls the moving device 13, the nozzle device 14, and the optical device 15 to form the layer 110b (S1). At S1, the material 121 is fed and the laser beam L1 irradiates on the basis of the data (reference data) about the layer 110b stored in the storage unit. At this time, the control unit 17 controls the moving device 13, the feeding device 31, and the like to feed the material 121 from the nozzle 33 to a predetermined range, and controls the laser emitter 41 to melt the fed material 121 by the laser beam L1. Therefore, a predetermined amount of the molten material 121 is fed to a range in which the layer 110b is formed on the base 110a. At this time, in the present embodiment, the material 121 is fed so that the layer 110b to be formed has a height larger than the height in the data about the layer 110b stored in the storage unit. After the material 121 is jetted or extruded on the base 110a or the layer 110b, a mass of the material 121, such as a layer or a thin film, is formed. At this time, the material 121 is cooled by the carrier gas carrying the material 121 or solidified by being cooled due to heat transfer to the mass of the material 121, and then the layer 110b is formed. The control unit 17 may perform annealing. In the annealing, the control unit 17 controls the laser emitter 41 so that the laser beam L1 irradiates the layer 110b on onto the base 110a. Therefore, after the material 121 in the layer 110b is melted again, the material 121 is solidified again. Note that, annealing may be performed outside the additive manufacturing apparatus 1, using an annealing apparatus (not illustrated).

Figure 6:
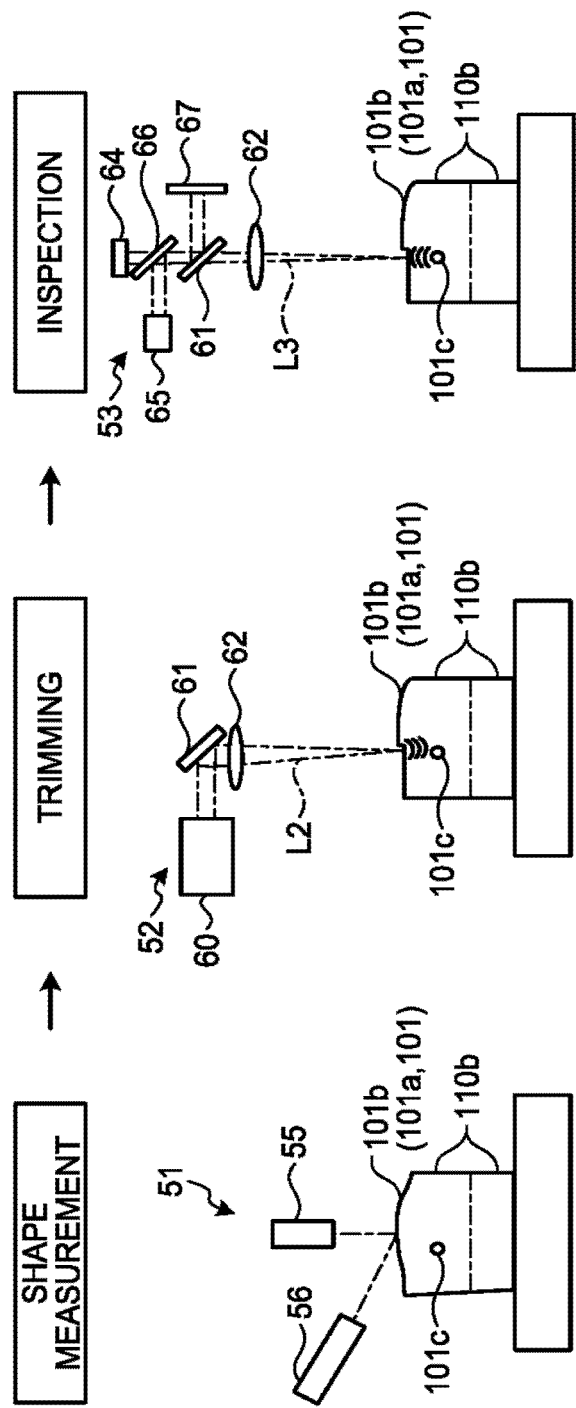
FIG. 6 is an exemplary explanatory view of an abnormality detection process for an additive manufactured object according to the first embodiment.

Next, the control unit 17 controls the inspection device 16 and the moving device 13 to inspect inside the manufactured object 101 (S2: abnormality detection process (inspection process)). As illustrated in FIG. 6, at S2, shape measurement, trimming, and inspection are performed. First of all, the control unit 17 controls the measurement unit 51 and the moving device 13 to measure the shape (surface shape, three-dimensional shape) of the surface 101a of the layer 110b of the manufactured object 101. The control unit 17 obtains measured shape data representing the shape of the layer 110b from the measurement unit 51. Then, the control unit 17 controls the processing unit 52 and the moving device 13 to trim the end face 101b of the manufactured object 101 (surface 101a). At this time, the control unit 17 controls the processing unit 52 and the moving device 13 so that the height of the layer 110b is substantially the same as the height indicated in the data about the layer 110b stored in the storage unit (e.g., a certain height). At this time, the control unit 17 changes the amount of end face 101b to be removed according to a measured height of the end face 101b of the layer 110b (irregularities) so that the height of the end face 101b of the layer 110b (thickness of the layer 110b) is substantially constant. Specifically, the control unit 17 controls the processing unit 52 so that the laser beam L2 has intensity according to the amount of end face 101b to be removed. Therefore, for example, a next layer 110b can be effectively formed flat, or accuracy in detection of the elastic wave is effectively increased. Trimming is performed with irradiation with the laser beam L2 by the processing unit 52. Then, the laser interferometer 53 detects, using the laser beam L3, the elastic wave generated by irradiation with the laser beam L2, and the inspection unit 54 detects (determines) the presence or absence of an abnormality 101c in the manufactured object 101 on the basis of a detection result from the laser interferometer 53. The detection of the presence or absence of the abnormality 101c is performed whenever the laser beam L2 is emitted. In the present embodiment, detection of the presence or absence of the abnormality 101c is performed for whole area of the end face 101b. Furthermore, when comparison, which is performed between reference shape data about the layer 110b stored in the storage unit and the measured shape data as a measurement result from the measurement unit 51, shows that the manufacturing is performed in a portion (area) where the manufacturing should not be performed, the control unit 17 removes the portion at the trimming. For example, when manufacturing is performed in a portion (area) where manufacturing should not be performed in a direction orthogonal to the stacking direction, the control unit 17 removes the portion.

S2 may be performed whenever one layer 110b is formed, or may be performed whenever a plurality of layers 110b is formed. S2 is performed after the layer 110b is formed. Note that, the shape measurement and the trimming may be performed whenever one layer 110b is formed, and detection of the elastic wave may be performed whenever a plurality of layers 110b is formed.

Figure 5:
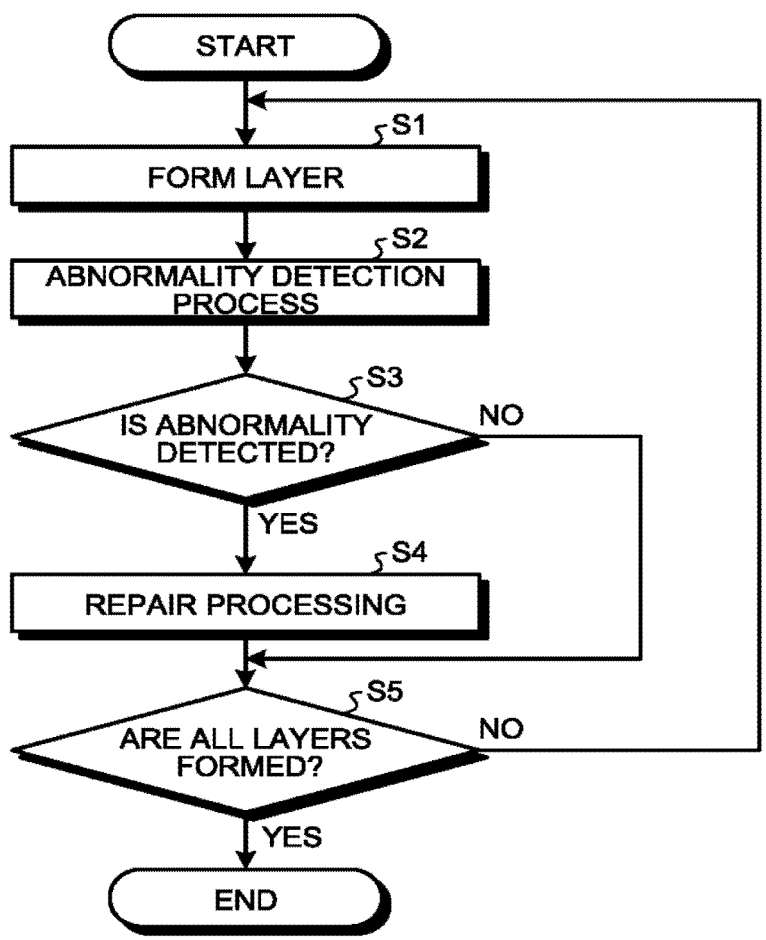
FIG. 5 is an exemplary flowchart of a procedure to form an additive manufactured object according to the first embodiment.
Figure 7:
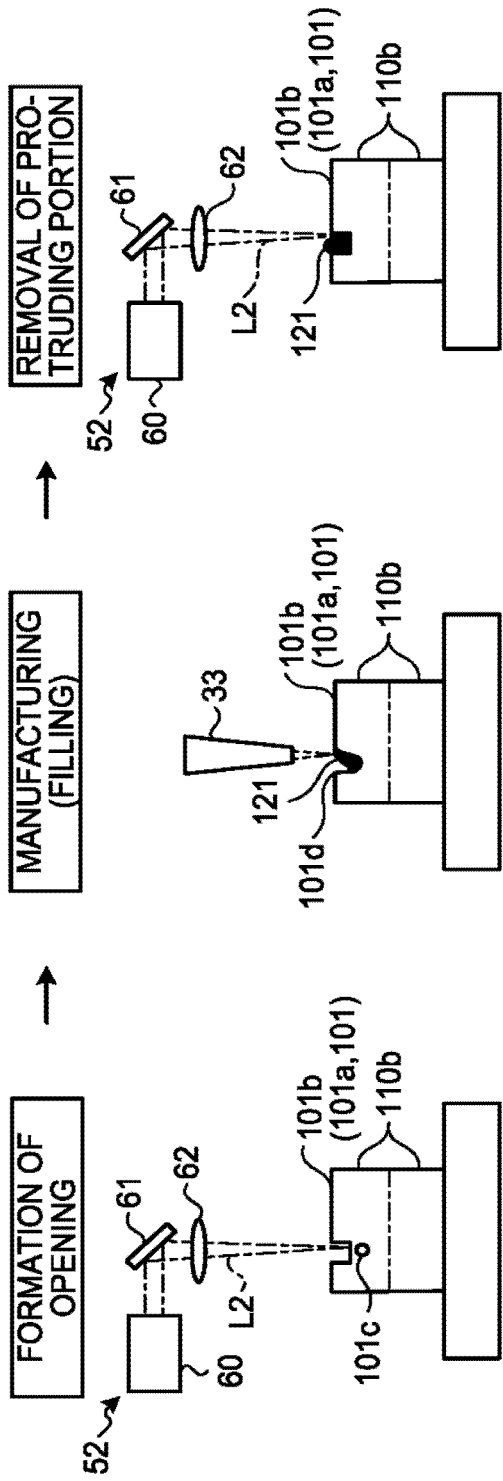
FIG. 7 is an exemplary explanatory view of repair processing for an additive manufactured object according to the first embodiment.

Then, as illustrated in FIG. 5, when the inspection device 16 (the inspection unit 54) detects an abnormality 101c in the manufactured object 101 ("Yes" at S3), the control unit 17 repairs (removes) the abnormality 101c (S4: repairing processing). When the abnormality 101c is a void, at S4, formation of an opening, manufacturing (filling), and removal of a protruding portion are performed, as illustrated in FIG. 7. First of all, the control unit 17 controls the processing unit 52 and the moving device 13 to remove a portion of the manufactured object 101 between the end face 101b (surface 101a) and the abnormality 101c, that is, a portion of the manufactured object 101 on a side of the end face 101b relative to the abnormality 101c. Therefore, an opening 101d is formed in the manufactured object 101 to have the abnormality 101c at the bottom. Next, the control unit 17 controls the manufacturing unit 18 so that the opening 101d is filled with the material 121 and the material 121 is solidified. At this time, the manufacturing unit 18 performs manufacturing, for example, until the material 121 protrudes from the opening 101d. Then, the control unit 17 controls the processing unit 52 to remove at least part of the manufactured object 101 protruded from the opening 101d, that is, all or part of a portion of the manufactured object 101 protruding from the opening 101d. More specifically, the control unit 17 controls the laser emitter 60 of the processing unit 52 to vaporize the protruding portion (material 121) protruded from the opening 101d. Since the protruding portion is removed as described above, a filled portion is further readily leveled. Note that, S4 may be performed whenever a plurality of layers 110b is formed.

In contrast, when the inspection device 16 does not detect the abnormality 101c in the manufactured object 101 ("No" at S3), S4 is not performed.

Next, as illustrated in FIG. 5, when not all layers 110b are formed ("No" at S5), the processing returns to S1, and a new layer 110b is formed on the layer 110b having been formed. The control unit 17 repeatedly performs processing of S1 to S5 to stack the plurality of layers 110b. When all layer 110b are formed ("Yes" at S5), a series of processing is finished.

As described above, in the present embodiment, the manufacturing unit 18 sequentially stacks the layer 110b formed by irradiating the powdered (or linear) material 121 with the laser beam L1 (first energy beam) and solidifying the material 121; the processing unit 52 (elastic wave generation unit) generates the elastic wave propagating in the manufactured object 101 including at least one layer 110b; the laser interferometer 53 detects the elastic wave; and the inspection unit 54 inspects the manufactured object 101 on the basis of a detection result from the laser interferometer 53. Thus, the abnormality 101c in the manufactured object 101 can be detected.

Furthermore, in the present embodiment, the processing unit 52 processes the surface 101a of the manufactured object 101 by irradiation with the laser beam L2 (second energy beam). The processing unit 52 irradiates the surface 101a with the laser beam L2 to generate the elastic wave. That is, since the processing unit 52 functions as the elastic wave generation unit, the additive manufacturing apparatus 1 can have a simple configuration in comparison with a configuration in which the elastic wave generation unit is provided separately from the processing unit 52.

Furthermore, in the present embodiment, the laser beam L2 (first laser beam) and the laser beam L3 (second laser beam) do not interfere with each other. Thus, the abnormality 101c in the manufactured object 101 can be detected with high accuracy.

Furthermore, in the present embodiment, a single lens 62 focuses the laser beam L2 and the laser beam L3. Thus, the additive manufacturing apparatus 1 can have a simple configuration in comparison with a configuration in which the laser beam L2 and the laser beam L3 are focused by different lenses.

Furthermore, in the present embodiment, the processing unit 52 (removal unit) can partially remove the manufactured object 101. When the inspection unit 54 detects the abnormality 101c in the manufactured object 101, the processing unit 52 partially removes the manufactured object 101 from the surface 101a of the manufactured object 101 to the abnormality 101c, and then the manufacturing unit 18 fills the material 121 in the opening 101d of the manufactured object 101 formed after removal thereof by the processing unit 52, so that the material 121 is solidified. Thus, the manufactured object 101 repaired after removing the abnormality 101c can be obtained.

Second Embodiment

Figure 8:
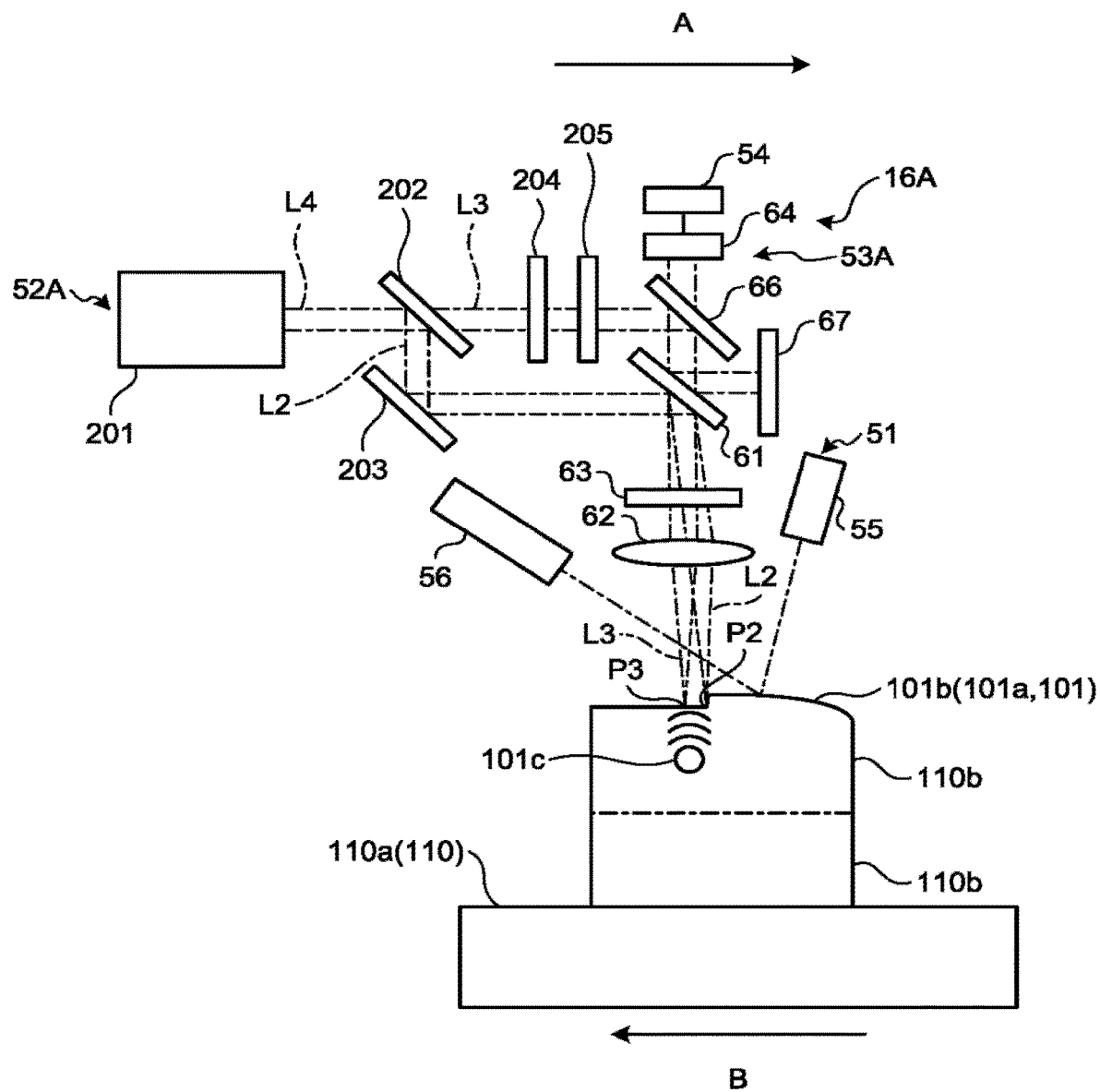
FIG. 8 is an exemplary schematic view of an inspection device according to a second embodiment.

An additive manufacturing apparatus 1A according to the present embodiment includes a configuration similar to that of the additive manufacturing apparatus 1 according to the first embodiment. However, in the present embodiment, an inspection device 16A is different from the inspection device 16 according to the first embodiment, as illustrated in FIG. 8.

The inspection device 16A has the measurement unit 51, a processing unit 52A, a laser interferometer 53A, and the inspection unit 54.

In the present embodiment, a laser emitter 201 (light source), the beam splitter 61, the beam splitter 66, a beam splitter 202, the mirror 67, a mirror 203, the lens 62 (condensing lens), a wavelength converter 204, a light intensity adjusting member 205, and the detector 64 are provided as members constituting the processing unit 52A and the laser interferometer 53A. The processing unit 52A has the laser emitter 201, the beam splitters 61 and 202, the mirror 203, and the lens 62. In contrast, the laser interferometer 53A has the laser emitter 201, the beam splitters 61, 66, and 202, the lens 62, the mirror 67, the wavelength converter 204, the light intensity adjusting member 205, and the detector 64. The processing unit 52A is an example of the elastic wave generation unit and the removal unit.

The laser emitter 201 has the oscillator (not illustrated), and emits a laser beam L4 oscillated by the oscillator. The laser beam L4 is, for example a pulse laser beam. The laser beam L4 is an example of a third laser beam.

The laser beam L2 emitted from the laser emitter 201 is made incident to the beam splitter 202, and is divided into the laser beam L2 and the laser beam L3 by the beam splitter 202. The beam splitter 202 is an example of a dividing unit.

The laser beam L2 is reflected from the mirror 203 and is made incident to the beam splitter 61. The laser beam L2 is partially reflected from the beam splitter 61, is focused by the lens 62, and irradiates the end face 101b of the manufactured object 101.

The laser beam L3 is made incident to the wavelength converter 204 and the light intensity adjusting member 205 in sequence, is converted in wavelength by the wavelength converter 204, and is reduced in light intensity by the light intensity adjusting member 205. The laser beam L3 emitted from the light intensity adjusting member 205 is made incident to the beam splitter 66. The laser beam L3 is partially reflected by the beam splitter 66, and is made incident to the beam splitter 61. The laser beam L3 incident to the beam splitter 61 is divided into light incident to the lens 62 and light incident to the mirror 67, similarly to the first embodiment. The laser beam L3 incident to the lens 62 is focused by the lens 62, and irradiates the end face 101b of the manufactured object 101. The laser beam L3 irradiating the end face 101b of the manufactured object 101 is reflected from the end face 101b, and is made incident to the detector 64 through the lens 62, the beam splitter 61, and the beam splitter 66. In contrast, the laser beam L3 reflected from the mirror 67 is made incident to the detector 64 through the beam splitter 61 and the beam splitter 66. Note that, the laser beam L3 is adjusted by the light intensity adjusting member 205 in light intensity to have intensity small enough to prevent melting of the material 121 on the end face 101b.

Furthermore, also in the present embodiment, a single lens 62 focuses the laser beam L2 and the laser beam L3, similarly to the first embodiment. Furthermore, the focal position (converging position) of the laser beam L2 focused by the lens 62 is different in location from the focal position (converging position) of the laser beam L3 focused by the lens 62. Specifically, in a relative movement direction of the laser beams L2 and L3, that is, a relative movement direction of the inspection device 16A relative to the manufactured object 101 (e.g., direction indicated by an arrow A), an irradiation position P3 of the laser beam L3 is positioned in back (on the upstream side) of an irradiation position P2 of the laser beam L2.

Furthermore, in the present embodiment, since the wavelength of the laser beam L3 is converted by the wavelength converter 204, the laser beam L3 and the laser beam L2 do not interference with each other even if the laser beam L3 and the laser beam L2 overlap each other.

As described above, in the present embodiment, a single laser emitter 201 emits the laser beam L4 (third laser beam), and the beam splitter 202 (dividing unit) divides the laser beam L4 emitted from the laser emitter 201 into the laser beam L2 (first laser beam) and the laser beam L3 (second laser beam). Thus, the number of laser emitters 201 can be reduced in comparison with a configuration in which laser emitters are provided for the laser beams L2 and L3 emitted from the laser emitter 201.

Note that, each of the above-described embodiments may be configured, for example, so that the feeding device 31 supplies a plurality of materials 121 of different kinds to the nozzle 33 and the plurality of different materials 121 is selectively supplied from the nozzle 33 so as to adjust (change) the percentages of the materials 121. Therefore, a gradient material (functional gradient material), in which the proportions of the materials 121 change (gradually reduce or gradually increase) according to the position (location) in the additive manufactured object 100, can be manufactured. Specifically, for example, upon forming the layer 110b, the control unit 17 can control the feeding device 31 to have the proportions of the materials 121 set (stored) corresponding to each position of three-dimensional coordinates of the additive manufactured object 100, so that the additive manufactured object 100 can be formed as the gradient material (functional gradient material) in which the proportions of the materials 121 are arbitrarily changed in a three-dimensional direction. An amount of change (rate of change) in percentage of the material 121 per unit length can be also variously set.

As described above, according to each of the above-described embodiments, the additive manufacturing apparatuses 1 and 1A and the additive manufacturing method can be obtained by which the abnormality 101c in the manufactured object 101 can be detected, for example.

Certain embodiments have been described, but these embodiments have been presented by way of example only, and are not intended to limit the scope of the inventions. The novel embodiments may be embodied in a variety of other forms, and furthermore, various omissions, substitutions and changes may be made without departing from the spirit of the inventions. The accompanying claims and their equivalents are intended to cover such embodiments or modifications as would fall within the scope and spirit of the inventions.

For example, the additive manufacturing apparatus may have a configuration (powder bed process) or the like, in which a step of feeding powder material by a material feed unit to form a material layer and a step of irradiating the material layer with the first energy beam such as laser beam by an irradiation device to solidify a material are repeatedly performed to stack solidified layers for manufacturing. In this configuration, the material 121 protruded from the opening 101d may be removed as required. For example, when the material 121 protruded from the opening 101d has a height smaller than the height of the material layer, the material 121 may not be removed.

Furthermore, in each of the above-described embodiments, the elastic wave is generated in an ablation mode using the laser beam L2 emitted from the processing unit 52, but a configuration for emitting the laser beam may be provided separately from the processing unit 52 to generate the elastic wave in a thermal stress mode using the laser beam.

The invention claimed is:

1. An additive manufacturing method comprising:
emitting a first energy beam to a material and solidifying the material to form a layer;
processing a surface of a manufactured object including the layer by emission of a second energy beam to the surface, and propagating, in the manufactured object, an elastic wave generated by impact of the emission of the second energy beam;
detecting the elastic wave; and
inspecting an abnormality in the manufactured object on the basis of a detection result about the elastic wave.

2. The additive manufacturing method according to claim 1, further comprising:
measuring a shape of the layer; and
processing the surface on the basis of a result of the measurement.

3. The additive manufacturing method according to claim 1, wherein the detecting includes detecting the elastic wave in an area of the manufactured object in which the surface is processed.

4. The additive manufacturing method according to claim 1, wherein
the second energy beam is a first laser beam for processing,
the additive manufacturing method further comprises emitting a second laser beam for detection to the surface and receiving reflected light of the second laser beam, including oscillation of the surface by the elastic wave, reflected from the surface to detect the elastic wave, and
the first laser beam and the second laser beam do not interfere with each other.

5. An additive manufacturing method comprising:
emitting an energy beam to a material and solidifying the material to form a layer;
emitting a laser beam for processing and detection;
dividing the laser beam into a first laser beam for processing and a second laser beam for detection;
processing a surface of a manufactured object including the layer by emission of the first laser beam to the surface, and propagating, in the manufactured object, an elastic wave generated by impact of the emission of the first laser beam;
emitting the second laser beam to the surface and receiving reflected light of the second laser beam including oscillation of the surface by the elastic wave to detect the elastic wave; and
inspecting an abnormality in the manufactured object on a basis of a detection result about the elastic wave.

6. The additive manufacturing method according to claim 1, further comprising
when the abnormality in the manufactured object is detected, partially removing the manufactured object from the surface of the manufactured object to the abnormality to form an opening, and filling the material in the opening of the manufactured object formed after removal thereof and solidifying the material.

7. The additive manufacturing method according to claim 6, wherein when a protruding portion is formed above a upper boundary of the opening by filling the material in the opening, the partially removing includes removing at least part of the protruding portion of the manufactured object.

* * * * *